United States Patent [19]

Chaudoir

[11] 4,389,562
[45] Jun. 21, 1983

[54] CONVEYOR OVEN

[75] Inventor: Roderick J. Chaudoir, Fox Point, Wis.

[73] Assignee: Hatco Corporation, Milwaukee, Wis.

[21] Appl. No.: 290,150

[22] Filed: Aug. 5, 1981

[51] Int. Cl.³ ............................ F27B 9/06; A21B 1/22
[52] U.S. Cl. .................................. 219/388; 99/443 C; 99/386; 34/212; 34/216; 198/864; 219/400; 432/239; 432/145
[58] Field of Search ............... 219/369, 370, 388, 400, 219/411; 99/339, 386, 443 C; 34/212, 216, 217, 236; 107/54.2; 198/733, 864; 432/148, 248, 239, 230, 145; 192/37; 194/37

[56] References Cited

U.S. PATENT DOCUMENTS

| 2,431,207 | 11/1947 | Stephens | 432/148 |
| 2,454,370 | 11/1948 | Beaubien | 219/388 |
| 2,504,110 | 4/1950 | Davis et al. | 219/388 |
| 3,156,812 | 11/1964 | Forman et al. | 219/388 |
| 3,222,800 | 12/1965 | Siegel et al. | 219/388 X |
| 3,239,651 | 3/1966 | Silberman | 219/388 |
| 3,249,741 | 5/1966 | Mills | 219/388 |
| 3,371,430 | 3/1968 | Bowman | 34/217 |
| 3,448,678 | 6/1969 | Burstein | 99/386 |
| 3,473,510 | 10/1969 | Shang et al. | 34/216 X |
| 3,515,854 | 6/1970 | Williams | 219/388 |
| 4,244,285 | 1/1981 | Baker | 99/339 |
| 4,252,055 | 2/1981 | Johansson et al. | 99/443 CX |
| 4,276,465 | 6/1981 | Flavio | 219/388 |
| 4,359,249 | 10/1982 | Ross | 34/212 |

Primary Examiner—Volodymyr Y. Mayewsky

[57] ABSTRACT

A conveyorized, electrically heated oven provides controlled top and bottom heating for pizza or other food products. Cooking is accomplished in two ways. The top of the food is cooked with heated air circulated within the oven, while the bottom of the food is heated by electric heating elements located between live conveyor rolls. Heated air within the oven is recirculated. In the preferred embodiment of the invention, two parallel conveyor lines are provided, with controls to permit use of one or both lines. Because of the heat recirculation system, the oven does not require a heat vent and energy consumption is reduced.

17 Claims, 10 Drawing Figures

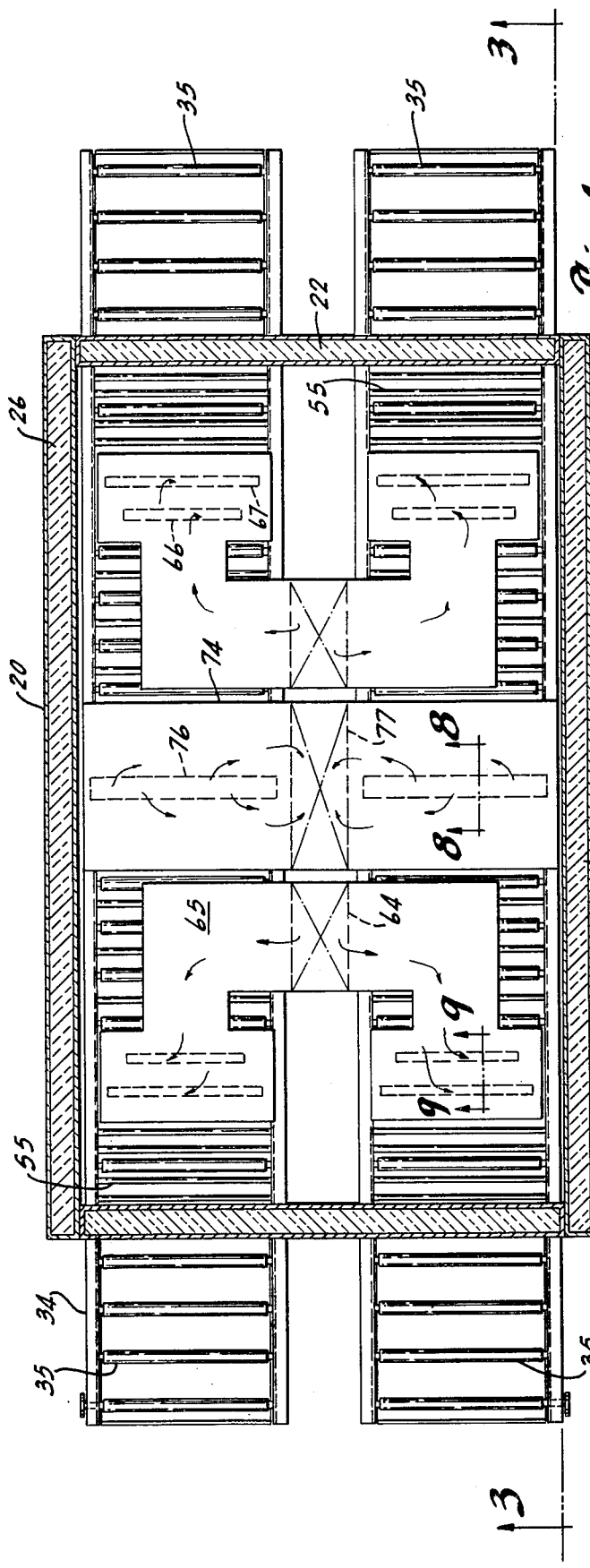
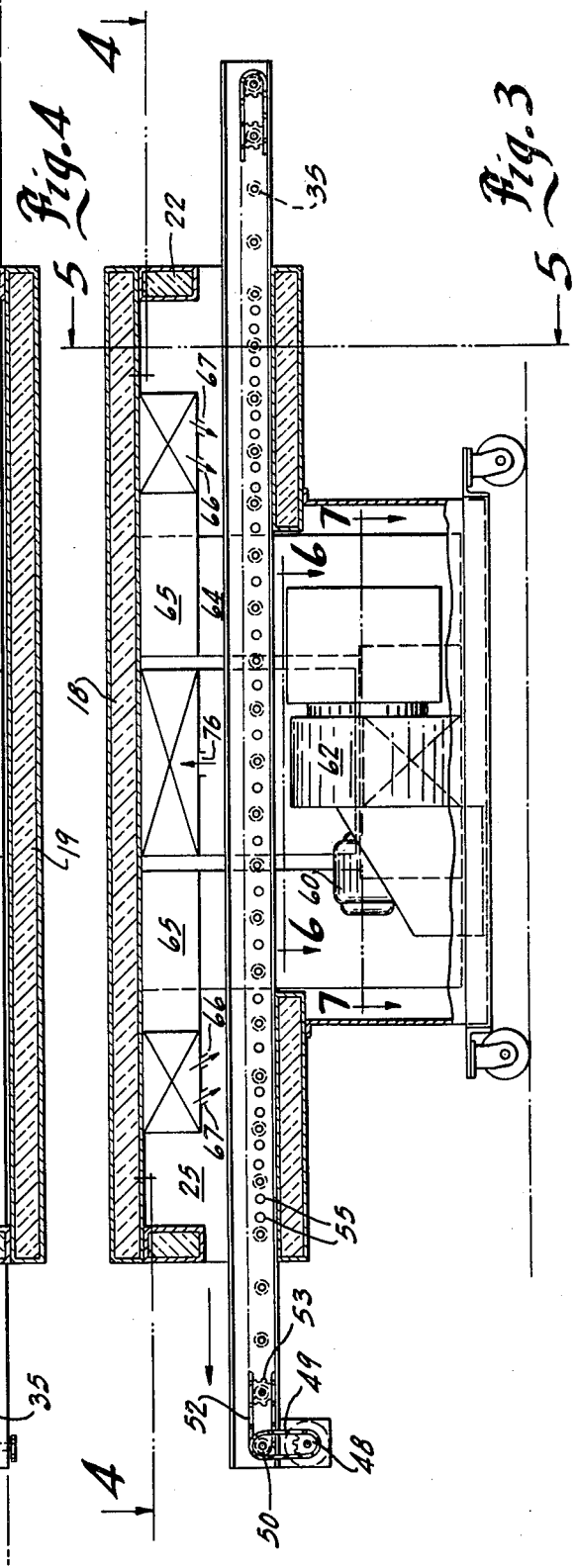

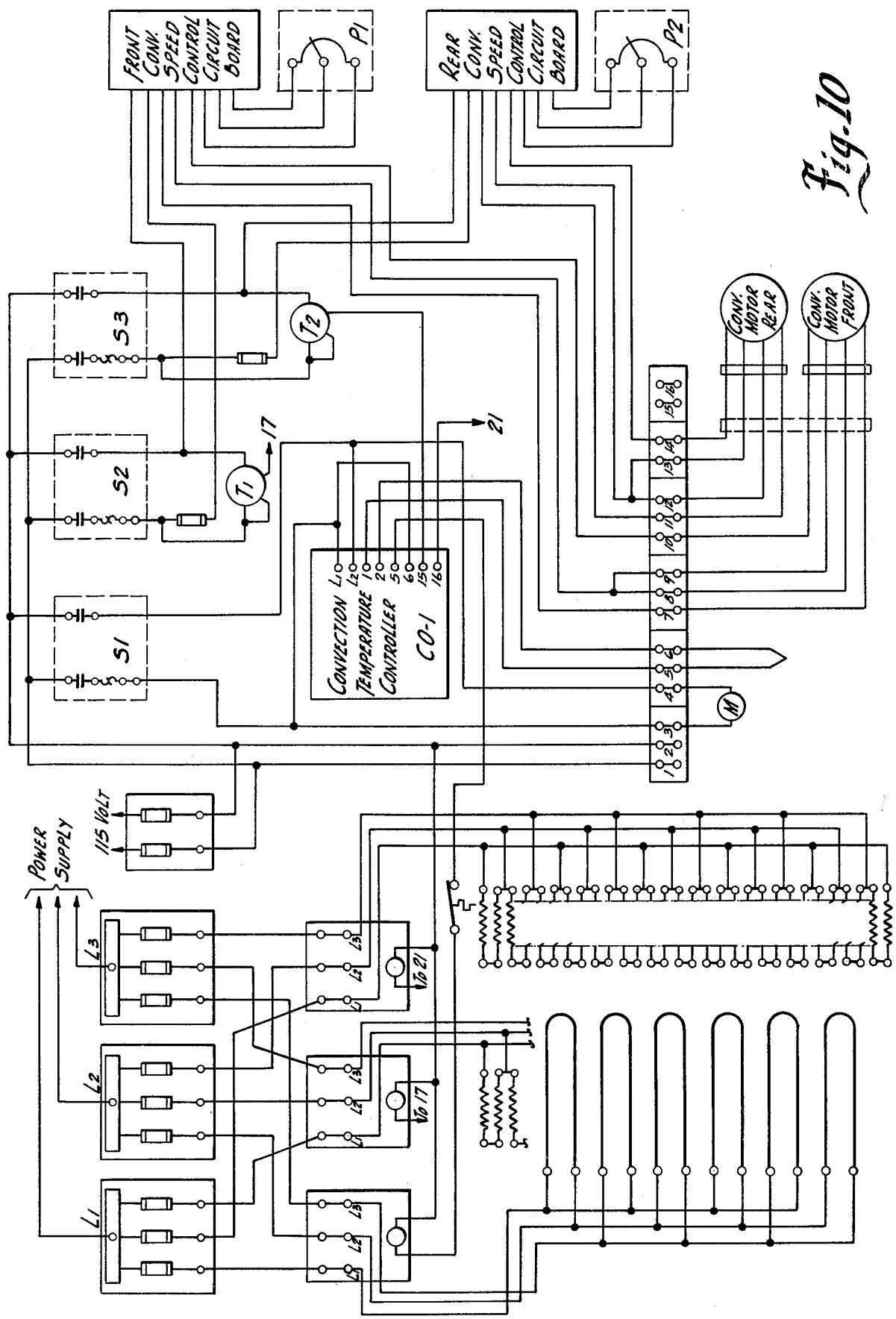

CONVEYOR OVEN

FIELD OF THE INVENTION

The present invention relates generally to the art of food ovens and more particularly to the art of conveyorized ovens designed for cooking food products as the same are moved by a conveyor from one end of the oven to the other.

BACKGROUND OF THE INVENTION

Conveyorized heaters are known to art. Such heaters have been employed in the furnace art and in the food art. It is the latter with which the present invention is particularly concerned.

One type of conveyorized food cooking device is the popular hamburger broiler in which rollers or a conveyor chain transports meat patties over heating elements. The heat source may be electric elements, gas burners or charcoal. Refinements for this type of device include automatic arms for turning the food product over to broil the reverse side.

Conveyorized ovens are also known which simultaneously cook both surfaces of the food product. One known conveyorized baking device employs a conveyor belt for moving food products through a heating chamber, heat being provided by a plurality of electric heating elements located above and below the conveyor belt. The conveyor belt itself is stainless steel and is driven by a driven roller at one end of the belt. The speed of the drive roller may be controlled to vary the cooking speed.

A similar type of oven is disclosed in Williams' U.S. Pat. No. 3,515,854 issued June 2, 1970 for "Conductive Baking Oven." In this patent, a continuous chain mesh conveyor carries food product through a baking chamber. The chain passes over a heat sink plate within the chamber and radiant heating rods are provided at the top of the heating chamber. Zone heating is provided by control of both the plate and the rods. It is disclosed in this patent that no convection heating currents are present.

Yet another type of radiant heater is disclosed in Silberman's U.S. Pat. No. 3,239,651 issued Mar. 8, 1966 for "Heating Unit." The device disclosed in this patent is superimposed over a conveyor for bread pans and is adapted for warming same prior to proofing. Radiant heating elements and reflective panels are provided for surrounding the pans and a fan blows air around the panels and between the panels and the outside housing to cool same.

In Stephens' U.S. Pat. No. 2,431,207 issued Nov. 18, 1947 for "Continuous Bake Oven" a heat source is provided below a continuous baking conveyor, the height of which may be adjusted to properly compensate for top and bottom baking temperatures. A fixed hearth is disposed intermediate the conveyor and the heat source, with ducts for circulating air which impinges on top of the baked products.

One additional type of prior art oven employs a continuous chain mesh conveyor to transport food through a heat chamber. The conveyor is speed and direction controlled and the heat may be adjusted at different zones within the oven. Heating is provided through venturi like jets located above and below the conveyor. Air, heated by gas or electricity, is forced through the jets onto the food product. This oven includes some recirculation of air from the heater to the product to minimize flue or vent loss.

All of the above ovens suffer from one or more disadvantages, the most important of which relate to cooking efficiency and energy consumption. Units which employ belt conveyors have a tendency to spill a considerable amount of heat requiring hoods and vents to maintain a surrounding environment suitable for workers. This also results in large power consumption and increased cost. Moreover, the use of radiant heating or convection heating as the sole heat source makes cooking impractical in those food outlets where the amount of product to be cooked varies substantially at different times of the day. Accordingly, a need exists in the art for a conveyorized oven which overcomes the above-noted disadvantages of the prior art.

OBJECTS OF THE INVENTION

It is a primary object of the present invention to provide a conveyorized oven which overcomes the above-noted disadvantages of the prior art.

Yet another object of the present invention is to provide a conveyorized oven which employs live rollers to convey food products through a cooking chamber.

A still further object of the invention is to provide a conveyorized oven which includes heat recirculation to minimize heat loss.

A further object of the present invention is to provide a conveyorized oven which is energy efficient and which does not require venting.

Another object of the present invention is to provide a conveyorized oven in which the speed of travel of the products through the cooking chamber and the heat generated by the two types of heating devices may be controlled to insure proper cooking.

Another object of the present invention is to provide a conveyorized oven which in one embodiment includes a pair of parallel conveyors with controls to select one or both lines depending on the demand for cooked food products.

Another object of the present invention is to provide a conveyorized oven which employs two different type of heating to assure proper cooking of the top and bottom of the food product.

How these and other objects of the invention are accomplished will be described in the following specification taken in conjunction with the FIGURES. Generally, however, the objects are accomplished by providing a conveyorized oven which employs live rollers to transport food products, such as pizza, through a baking chamber. Electric heating elements are provided between certain of the live rollers for supplying cooking heat to the bottom of the food product. The top of the food is cooked by heated air circulated within the oven. An inlet at the center of the oven serves as an inlet to the air recirculation system which is provided to minimize energy consumption and eliminate the need for any type of external vent or hood. The unit is insulated to prevent heat loss and is preferably constructed so that the top of the oven may be used as a work surface. Controls are provided for varying the roller speed and the heat provided by the two heat sources. In a preferred embodiment of the present invention, the oven includes two parallel conveyors with separate controls. This feature permits use of only one-half of the oven in periods of reduced product demand. Other features of the invention and a more complete description of how the objects of the invention are accomplished are provided below.

DESCRIPTION OF THE DRAWINGS

FIG. 3 is a vertical cross section through the oven depicted in FIG. 1 taken along the line 3—3 of FIG. 4;

FIG. 4 is a horizontal cross section of the oven depicted in FIG. 1 taken along the line 4—4 of FIG. 3;

FIG. 10 is a simplified wiring diagram for the oven shown in FIG. 1.

DESCRIPTION OF THE PREFERRED EMBODIMENT

Figure 1:
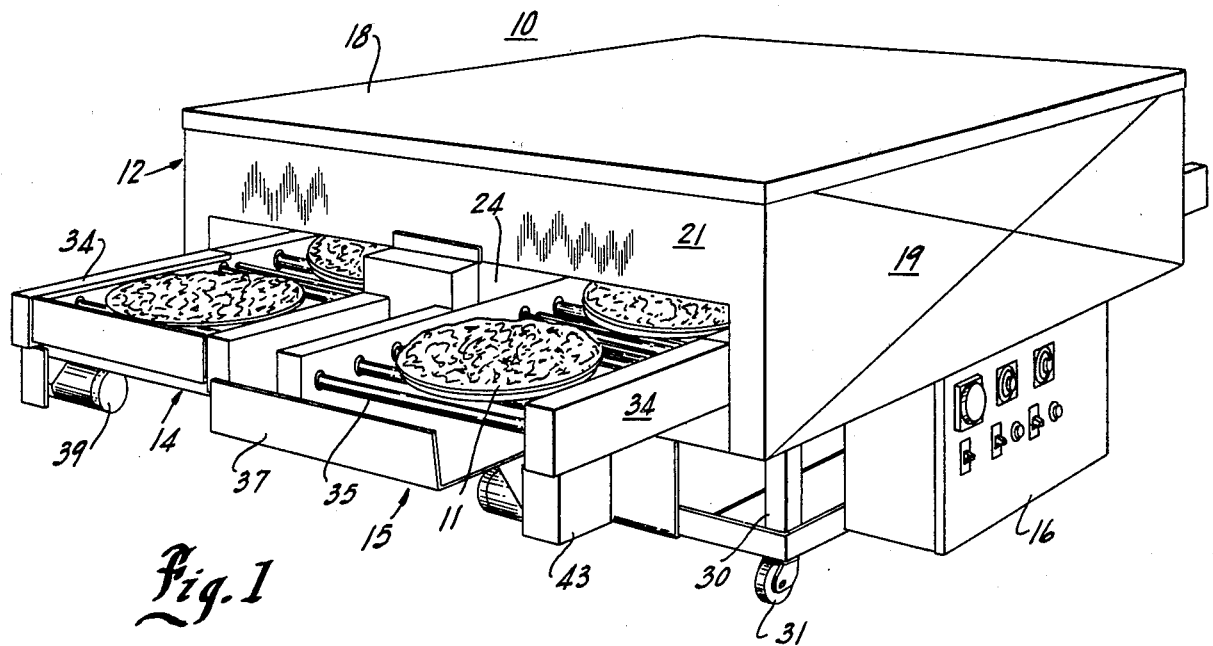
FIG. 1 is a perspective view of a conveyorized oven according to one preferred embodiment of the present invention and showing a double conveyor oven.

FIG. 1 is a perspective view of a conveyorized oven 10 according to the preferred embodiment of the present invention. While the device shows that pizza pies 11 are the food product to be cooked, it should be clearly understood that oven 10 has a wide variety of applications. The illustration with pizza is for purposes of illustration rather than limitation.

Oven 10 comprises three main components: an oven housing 12, a pair of conveyors 14 and 15, and a control panel 16. Housing 12 includes a generally square top 18, side walls 19 and 20, and generally rectangular front and back walls 21 and 22, the latter each having a pair of aligned openings 24 for receiving the conveyors 14 and 15. The openings define the ends of an elongate heating tunnel 25 which extends through cabinet 12. By reference to FIGS. 3 and 4, it will be appreciated that the various walls of oven 10 are insulated by insulation 26 to prevent heat loss.

Housing 12 is supported on a metal framework 30 and casters 31 are provided to facilitate movement of oven 10. In the preferred embodiment, oven 10 is constructed so that the top 18 is at a convenient height so that it may be employed as a work surface. Oven 10, therefore, serves a dual function and reduces the overall space requirements for any facility employing oven 10.

The conveyors 14 and 15 will be described in greater detail later in this specification, but at this point it should be understood that oven 10 includes two spaced apart and parallel conveyor lines and that the lines extend beyond the front and back walls 21 and 22 of housing 12. While the length of the extension is not critical to the present invention, it is convenient to have enough extra length to permit food products to be loaded onto the conveyors and removed therefrom. It may, in some instances, also be desirable to have an extra length on the exit end to allow accumulation of cooked food products.

Each of conveyors 14 and 15 include a pair of side support beams 34 having a plurality of conveyor rollers 35 supported therebetween. Beams 34 are hollow and contain the gear, chain, and bearing systems to be described later herein. Conveyors 14 and 15 also each include a tray 37 disposed beneath the rollers 35 and resting upon the floor of the oven housing 12. FIG. 1 shows one of such trays being partially opened and it will be appreciated that the trays are provided to catch crumbs or spills and that they are removable to facilitate cleaning of the oven. The two conveyors also each include a conveyor drive motor 39 mounted at the front end and on the outside corner of the conveyors. Such motors are employed for driving the rollers 35.

The control panel 16 shown in FIG. 1 is mounted beneath the housing 12 and includes the various switch and control devices for carrying out operation of oven 10. The electrical system will be described more fully in a later section of this specification.

Figure 2:
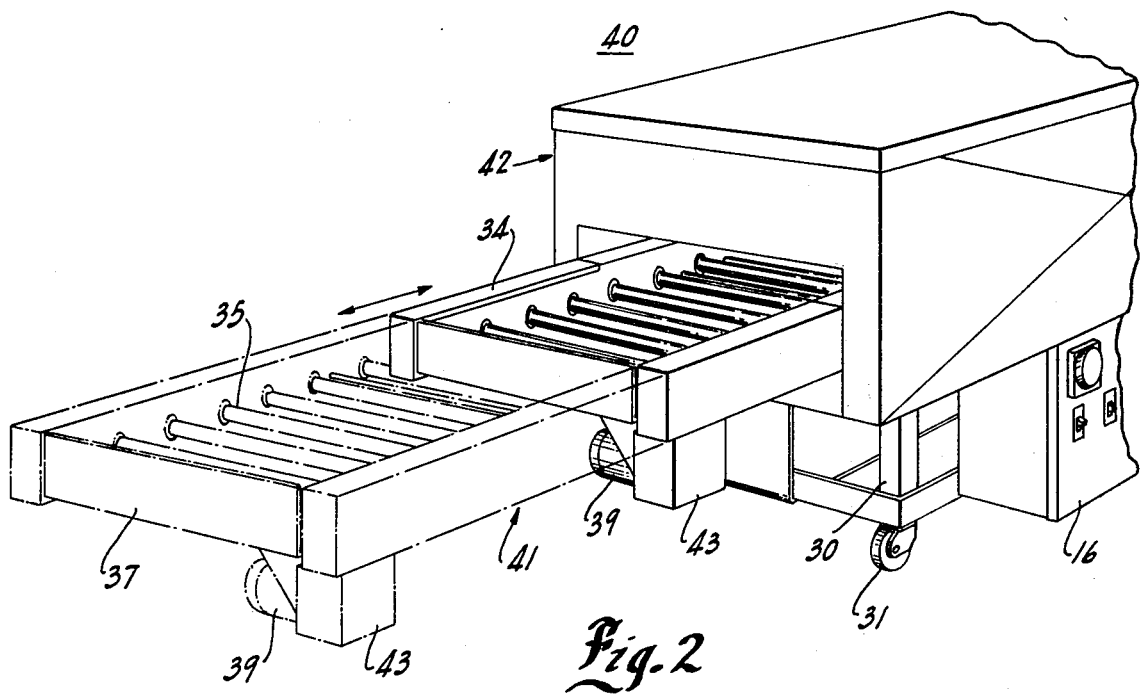
FIG. 2 is a perspective view of an alternate embodiment of the present invention showing a conveyorized oven with a single conveyor and showing in dotted line that the conveyor is slidably received within the oven.

Dealing next with FIG. 2, an alternate embodiment 40 of the present invention is shown. Oven 40 differs from oven 10 in having only a single conveyor 41. The overall shape of cabinet 42 is also different, the top being rectangular in configuration. Another feature of the present invention which is apparent in FIG. 2 and is applicable to both embodiments is that the conveyor assembly is slidably and removably received within the oven cabinets. This feature permits the conveyor to be shipped separate and apart from the cabinets and facilitates cleaning of the oven as well as repair and maintenance of the electrical and drive components for the rollers and heating elements.

By reference to FIGS. 1 and 2, it can also be seen that a drive gear housing 43 is provided to contain the coupling between the drive motors 39 and the internal components within support beams 34. The housing also serves as a stop to ensure that when the conveyor assemblies are inserted into the ovens, they will be located at the proper location.

The choice of whether to use a single or double conveyor oven or an oven with three or even more conveyors will in large measure depend on the product demand of the facility which employs the ovens. A primary advantage of systems having more than one conveyor is that only a single set of conveyors need be utilized during periods of reduced demand while additional sets would be available during periods of peak demand. Another advantage of the multi-conveyor system is that different products can be cooked on the various conveyors since the temperature of the bottom heating elements can be separately adjusted. This system may be particularly applicable for different types of pizza for example where different ingredients and/or different types of crusts are employed. Some products can be properly cooked with a lower bottom heat than others. Primarily though the advantage of the multi-conveyor systems is that one or more entire conveyor assemblies may be turned off during periods of slack demand with the consequent savings in energy.

Referring next to FIGS. 3 and 4, rollers 35 are live rollers driven by motors 39. A sprocket 48 is coupled to the motor shaft which in turn is coupled by a first chain 49 to another sprocket 50 at one end of the support beam 34. A second chain then connects sprocket 50 and the remaining roller sprockets 53 to drive same. Only a few of the sprockets 53 are shown in FIG. 3 to simplify the drawings for clarity of explanation. As will be appreciated by reference to the wiring diagram in FIG.

10, both the speed and the direction of the conveyors can be varied through appropriate electronic control.

Disposed between those rollers 35 which normally lie within the housings 12 and 42 are electrical elements 55 which preferably are of the resistance bar type. The invention is not to be limited to such types of heating elements as other types of gas or electric heaters may be employed. It can also be seen from FIGS. 3 and 4 that two such elements 55 are provided between each of the first three sets of rollers which lie within housings 12 and 42, while only a single element 55 is provided between the live rollers in the central portion of the oven. These additional elements are provided at the ends of the oven to compensate for the cooling effect at the openings to the exterior of the oven and to rapidly heat food pans or the like used to contain food products. In lieu of multiple elements, higher wattage elements could be provided for the same purpose. The electrical connections for the various heating elements will not be described in detail, but a representative wiring diagram therefore is shown in FIG. 10.

Figure 5:
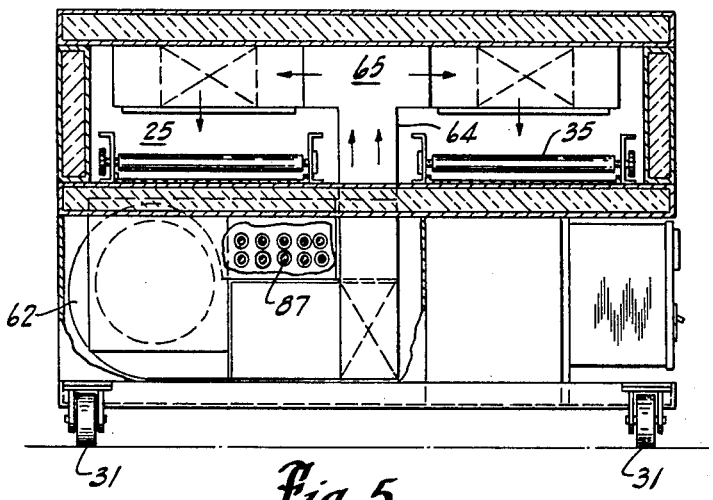
FIG. 5 is a section taken along the line 5—5 of FIG. 3, with parts broken away.
Figure 6:
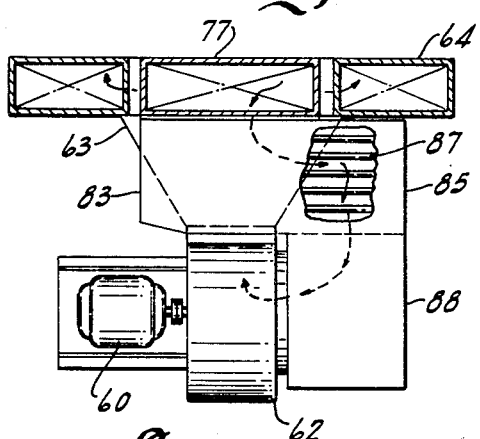
FIG. 6 is a section taken along the line 6—6 of FIG. 3, with parts broken away.
Figure 7:
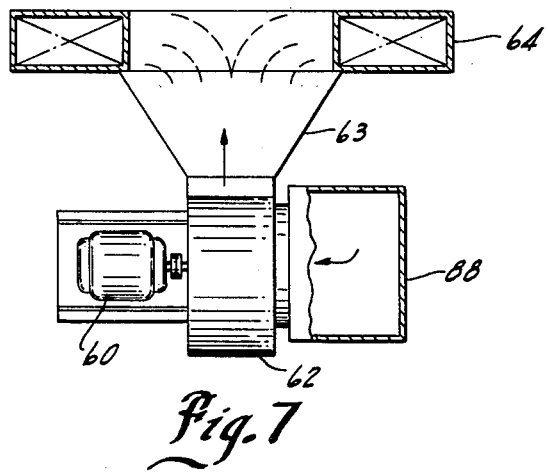
FIG. 7 is a section taken along the line 7—7 of FIG. 3.

Proceeding next to a description of the air heating features of oven 10, it will be noticed in FIGS. 5–7 that an electrical motor 60 is disposed beneath cabinet 12 and is coupled to a blower 62 which may be of the squirrel-cage or any other suitable type. The outlet of the blower is coupled to a first duct 63 located below cabinet 12 which in turn is coupled to a pair of vertical ducts 64 which extend toward the top of cabinet 12 between the conveyor lines 14 and 15. Ducts 64 are generally in the center portion of cabinet 12, but in a spaced apart relationship. Ducts 64 in turn are coupled to a pair of generally U-shaped plenums 65 adjacent the roof of heating tunnel 25 with the legs of the U oriented generally toward the entrance and exit of the oven respectively.

Air outlets 66 and 67 are located adjacent the end of each of the U-legs and above the two conveyor lines. Outlets 66 and 67 are in the form of slots with outlets 66 located just interiorly of outlets 67. In the illustrated embodiment, outlets 66 are shorter in length than outlets 67, but this feature is not critical to the present invention. By reference to FIG. 3, it will be noticed that the slot outlets are located inside the front and back walls 21 and 22 by several roller pairs.

Figure 9:
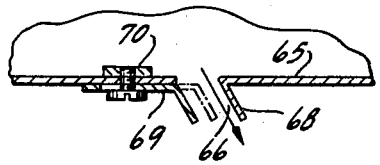
FIG. 9 is a section taken along the line 9—9 of FIG. 4.

By reference to FIG. 9, the preferred form for outlets 66 and 67 is shown in detailed cross section. While only a single outlet is shown, the principles are applicable to both. It will be noticed from this FIGURE that the outlet is slanted generally toward the center of the heating tunnel 25. A first edge 68 of the outlet is formed by a downwardly extending flange of the sheet metal or other material used to construct the U-shaped plenum. The other half of the slot is formed by an elongate member 69 having two legs and an obtuse angle therebetween. The member 69 is secured to plenum 65 by a locking assembly 70 which permits the downwardly extended edge of member 70 to be moved toward and away from flange 68. In this way, the adjustment of the width of the slots may be conveniently made.

With reference to the air distribution system, it will be obvious that when using only a single conveyor line, the U-shaped plenum 65 would be eliminated in favor of an elongate duct extending between the front and rear of oven 40 with a pair of air outlets located at the ends of the duct to provide heating air above food products conveyed on assembly 41. The same slot width adjustment means would be provided as used in the double conveyor system.

The air return system also includes a plenum 74 located at the center of oven 10 and extending between the side walls 19 and 20. Plenum 74 is also generally rectangular in cross section and includes a pair of air inlet slots 76 located above the conveyor rollers and heating elements. A vertical duct 77 is coupled to plenum 74 at the interior of cabinet 12 and intermediate the conveyor lines, duct 77 extending downwardly toward blower 62. Air inlets 76 may also include the adjustment means such as those illustrated in FIG. 8.

Figure 8:
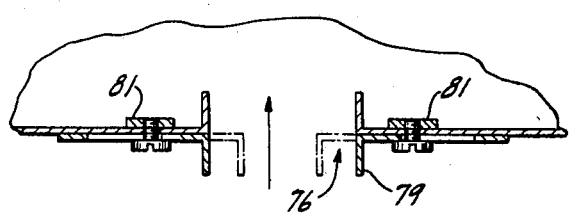
FIG. 8 is a section taken along the line 8—8 of FIG. 4.

In FIG. 8, the adjustment means include slidable and elongate angle members 79 coupled to plenum 74 with locking members 81. The downwardly depending flanges may be moved toward or away from one another to set the openings at the desired distance. Movement of angle members 79 is illustrated in dotted line in FIG. 8.

Duct 77 terminates below the floor of cabinet 12 in a housing 83 which in turn has an outlet coupled to an airflow housing 85 located on the opposite side of the blower 62 from motor 60. A plurality of resistance type heating elements 87 are mounted within housing 85 and serve to heat the air flowing therethrough. The outlet of housing 85 is coupled to another chamber 88 located at the inlet side of blower 62.

The principles of this air return system are also applicable to a single conveyor line with only a single inlet 76 being required.

Now that the components of the airflow system have been desired, it will be appreciated that air is forced through outlets 66 and 67 in a downward direction onto food products being carried by rollers 35. The air is also forced inwardly towards the center of cabinet 12 thereby avoiding air spillage and loss of heat from within oven 10. The flow of air towards the middle of the oven is insured by the air inlets to duct 76 located at the center of the oven.

Now that the overall configuration of ovens 10 and 40 have been described, the operation thereof will be described with particular reference to oven 10. The oven is assembled by inserting conveyors 14 and 15 into the openings 24 provided in the oven. The necessary electrical connections are then made.

Food products are placed on rollers 45 and passed into cabinet 12 at a speed which is set on panel 16. The heating elements 55 are energized and set at the correct temperature for the particular food product. Likewise, the heating elements 87 and the motor 60 are energized, each at the correct speed and temperature to ensure a proper flow of air through the airflow system for the particular products to be cooked. The inlets and outlets are also adjusted to ensure precise control of the cooking parameters. The food is cooked from the top and the bottom as it passes through cabinet 12 and exits onto the conveyor rollers 35 at the exit end of the oven.

As has previously been indicated, the conveyor motors for the conveyor assembly 14 and 15 may be operated independently as are the elements 55 disposed in the respective conveyor lines. Different products may be cooked on the respective conveyor lines.

FIG. 10 is a wiring diagram for oven 10 and includes standard electronic nomenclature. It will be apparent that other wiring procedures may be employed by one skilled in the art after reading the foregoing specifications.

While the present invention has been illustrated by reference to two preferred embodiments, it is not to be limited thereby, but is to be limited solely by the claims which follow.

I claim:

1. A conveyorized oven comprising:
   an insulated oven housing having at least one pair of spaced apart openings and an elongate heating tunnel located between each pair of openings;
   conveyor means extending between each pair of said openings and adapted for moving a product to be heated from one of said openings to the other of said openings through said heating tunnel, said conveyor means comprising a bed of live rollers and said oven further comprising motor means coupled to said rollers for revolving said rollers whereby product may be moved through said heating tunnel;
   heating element means located along the floor of said heating tunnel and adapted for heating product carried through said heating tunnel by said conveyor means, said heating element means comprising a plurality of elongate electrical resistance heating elements and wherein said resistance heating elements are disposed between said live rollers;
   fan means;
   duct means coupled to said fan means and including outlet means within said heating tunnel above said conveyor means; and,
   air heating means for heating air flowing through said duct means whereby product carried through said heating tunnel by said conveyor means is heated by heated air as well as by said heating element means.

2. The invention set forth in claim 1 wherein said conveyor means is removably and slidably disposed within said heating tunnel and extends beyond said openings exteriorly of said oven whereby product may be loaded on said conveyor means and removed therefrom.

3. The invention set forth in claim 1 wherein said live rollers are substantially evenly spaced between said openings and wherein at least one of said heating elements is located between each pair of said live rollers within said heating tunnel.

4. The invention set forth in claim 3 wherein two of said heating elements are located between at least those two pairs of live rollers located nearest said openings and a single one of said heating elements is located between those pairs of live rollers located nearest the middle of said heating tunnel.

5. The invention set forth in any of claim 1, 2, 3, or 4 wherein said oven further includes control means for varying the speed of said conveyor means and for adjusting the temperature of said heating element means.

6. The invention set forth in any of claim 1, 2, 3, or 4 wherein said oven is a dual conveyor oven having two sets of said conveyor means, heating element means, openings and said heating tunnels and wherein control means are provided for independently varying the speed of said two conveyor means and for independently adjusting the temperature of said heating element means with said two heating tunnels.

7. The invention set forth in claim 1 wherein said duct means includes an elongate manifold duct extending along said heating tunnel and generally adjacent the roof thereof and wherein said outlet means include outlet means located adjacent the ends of said manifold duct interiorly of said oven openings and displaced from the middle of said heating tunnel.

8. The invention set forth in claim 7 wherein said outlet means comprise slots arranged for directing heated air downwardly and inwardly within said heating tunnel.

9. The invention set forth in claim 8 wherein said slots include width adjustment means for varying the width of said slots to adjust the velocity and volume of heated air entering said heating tunnel through said duct means.

10. The invention set forth in claim 7 wherein said oven also includes air return duct means having collector air inlet opening means within said heating tunnel and wherein said return duct means is coupled to said air heating means and said fan means whereby air may be recirculated within said oven.

11. The invention set forth in claim 10 wherein said collector air inlet opening means is located intermediate said outlet means of said manifold duct means.

12. The invention set forth in claim 1, 7, 8, 9, 10, or 11 wherein said oven comprises a pair of parallel spaced apart and elongate heating tunnel means.

13. The invention set forth in claim 1, 7, 8, 9, 10, or 11 wherein said oven further comprises control means for said fan means to vary the air flow generated thereby into said duct means and control means for said air heating means to vary the temperature of the air heated thereby.

14. A conveyorized oven comprising:
   an insulated oven cabinet including a generally planar and horizontal top surface, said oven cabinet having at least one pair of aligned and spaced apart openings in opposed vertical walls thereof and a heating tunnel between each of said pair of openings;
   a conveyor assembly slidably and removably disposed in said cabinet and extending between each of said pair of openings and for an extended distance beyond each of said opposed walls, said conveyor assembly having a bed of live rollers and a motor coupled thereto for conveying a product from one end of said conveyor assembly to the other end thereof through said oven cabinet, electrical resistance heating element means being located on said conveyor assembly intermediate those pairs of adjacent live rollers which lie within said oven cabinet, control means provided for varying the speed of said conveyor assembly and the temperature of said resistance heating elements;
   air heating means and a housing therefor;
   fan means coupled to said air heating housing means;
   duct means coupled to said fan means and said air heating housing means for conveying heated air from said fan means to each of said heating tunnels and returning heated air from said heating tunnels to said fan means whereby air is recirculated within said oven, said duct means having outlet openings within said cabinet and arranged for directing heated air downwardly toward each of said conveyor assemblies and inlet openings within said cabinet and arranged for directing heated air from said heating tunnels to said air heating housing means.

15. The invention set forth in claim 14 wherein said oven comprises a dual oven having a pair of heating tunnels and a pair of generally parallel conveyor assemblies slidably and removably disposed in said cabinet and wherein said duct means includes outlet openings arranged for directing heated air downwardly toward both said conveyor assemblies and said oven further comprises control means for selectively and independently controlling the speed and temperature of said conveyor assemblies and the heating elements contained respectively therein.

16. The invention set forth in claim 14 or 15 wherein said outlet openings and inlet openings are slots and wherein the width of said slots are adjustable to control the velocity and volume of air entering and leaving said heating tunnels and wherein said oven further comprises speed control means for said fan means and temperature control means for said air heating means.

17. A conveyorized oven for heating food products and the like comprising a box-like insulated oven housing having generally planar, horizontal and spaced apart top and bottom surfaces and two pairs of opposed and vertical walls disposed therebetween, said oven having at least two elongate and parallel tunnels extending between one pair of said opposed vertical walls, an elongate conveyor and bottom heating assembly disposed within each of said tunnels and supported on the floors thereof, said assemblies extending beyond the walls of said oven, said assemblies each including a bed of live rollers and heating elements located between those pairs of rollers which lie within said tunnels, motor means and chain and sprocket means coupling said motor means and said rollers to rotate same, blower means disposed beneath said housing having duct means coupled thereto, said duct means including air injection and air return portions, said air injection portion including ductwork between said blower means and the roof of said tunnels and a manifold coupled thereto, said manifold including legs extending from the center portion of said oven toward said one pair of said opposed vertical walls and terminating within said housing and including outlet slot means at the ends of said legs and adapted for injecting air downwardly toward said conveyor and bottom heating assemblies and inwardly toward the center of said housing, said air return portion including air inlet slot means above each of said conveyor and bottom heating assemblies and generally over the middle thereof and collection manifold means to convey return air to said blower means, air heating means located in the return portion of said duct means and control means for separately and independently controlling the speed of each of said conveyors, the temperature of said heating elements located in said conveyor and bottom heating assemblies and for controlling the air heating means and the blower means.

* * * * *